(12) United States Patent
Nakashimo

(10) Patent No.: US 6,329,795 B1
(45) Date of Patent: Dec. 11, 2001

(54) CHARGING AND DISCHARGING CONTROL CIRCUIT AND CHARGING TYPE POWER SUPPLY DEVICE

(75) Inventor: Takao Nakashimo, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/310,908

(22) Filed: May 13, 1999

(30) Foreign Application Priority Data

May 15, 1998 (JP) ................................................ 10-133358

(51) Int. Cl.$^7$ .................................................. H01M 10/46
(52) U.S. Cl. ............................................. 320/134; 320/136
(58) Field of Search .................................. 320/116, 118, 320/134, 136

(56) References Cited

U.S. PATENT DOCUMENTS

| | | | |
|---|---|---|---|
| 5,206,578 | * | 4/1993 | Nor ....................................... 320/118 |
| 5,519,563 | * | 5/1996 | Higashijima et al. ............ 320/118 X |
| 5,547,775 | * | 8/1996 | Eguchi et al. ........................ 320/118 |
| 5,652,501 | * | 7/1997 | McClure et al. ................. 320/118 X |
| 5,742,148 | * | 4/1998 | Sudo et al. ........................ 320/118 X |

* cited by examiner

Primary Examiner—Edward H. Tso
(74) Attorney, Agent, or Firm—Adams & Wilks

(57) ABSTRACT

A charging and discharging control circuit has a construction which limits current consumption. A plurality of detecting circuits detect at least one of an over-charge voltage and an over-discharge voltage of an electric power source and output a corresponding signal. A control circuit receives an output signal of the detecting circuits and outputs a signal for controlling the charging and discharging of the secondary batteries. In order to limit current consumption, a single source current is provided to each of the detecting circuits. In a preferred embodiment, the electric power source comprises a plurality of serially-connected batteries and the detecting circuits each comprise a comparator for comparing a reference voltage with a voltage representing an output voltage of a respective battery. At least one of the positive power supply terminals and negative power supply terminals of the comparators are serially connected so that the power supply current of the charging and discharging control circuit is limited.

28 Claims, 4 Drawing Sheets

US 6,329,795 B1

CHARGING AND DISCHARGING CONTROL CIRCUIT AND CHARGING TYPE POWER SUPPLY DEVICE

BACKGROUND OF THE INVENTION

The present invention relates to a charging and discharging control circuit for controlling charging and discharging of secondary batteries and to a charging type power supply device having secondary batteries with the charging and discharging control circuit built therein.

As a conventional charging type power supply device comprising a secondary battery, a power supply device shown in a circuit block diagram of FIG. 2 is known. Such a structure is disclosed in, for example, Japanese published unexamined patent application number H4-75430(1992) entitled "CHARGING TYPE POWER SUPPLY DEVICE." More specifically, a secondary battery 101 is connected to an external terminal −V0 or +V0 through a switch circuit 103. Further, a charging and discharging control circuit 110 is connected in parallel to the secondary battery 101. The charging and discharging control circuit 110 has a function of detecting the voltage of the secondary battery 101. In the case that the secondary battery 101 is in either in an over-charged state (a state where the battery voltage is above a predetermined value —hereinafter referred to as an over-charge protection state) or in an over-discharge state (a state where the battery voltage is below a predetermined value —hereinafter referred to as an over-discharge protection state), a signal is output from the charging and discharging control circuit 110 to turn off the switch circuit 103. Further, it is possible to restrict the current through the switch circuit 103 by making, when the external terminal +V0 reaches a certain voltage, the switch circuit 103 turn off to stop the discharging. In other words, the discharging can be stopped when the current is excessive (over-current control). This state is hereinafter referred to as an over-current protection state. It is the role of the charging and discharging control circuit to protect the battery against these states.

Also, in the case that a plurality of secondary batteries are serially connected, a power supply device having a charging and discharging control circuit for detecting over-charge and over-discharge of the respective batteries can be similarly realized.

SUMMARY OF THE INVENTION

However, a charging and discharging control circuit structured in this way has a drawback in that, its own current consumption shortens the operating time per charge of an apparatus using the secondary battery.

FIG. 3 shows an example of an internal circuit of the charging and discharging control circuit 110 in the case where two secondary batteries are serially connected. In this circuit example, only a circuit for over-charge detection is shown, but the circuit used for over-discharge detection is similar to this. Description is made using the example of an internal circuit shown in FIG. 3.

The internal circuit example shown in FIG. 3 illustrates a case where comparators are used as means for detecting over-charge, but other detection means may also be used which are similar to this. The charging and discharging control circuit 110 comprises: over-charge detection comparators 113 and 114; reference voltage circuits 115 and 116 for supplying a predetermined reference voltage Vr to input terminals of the over-charge detection comparators 113 and 114; a voltage division circuit 111 including resistors R0–R1, for dividing the terminal voltage of the secondary batteries 101 and 102; a voltage division circuit 112 including resistors R2–R3; and an internal control circuit 120. In the example shown in the figure, only the case of two secondary batteries is illustrated, but cases where two or more secondary batteries are connected are similar to this. The over-charge detection comparators 113 and 114 have a function of comparing with the reference voltage Vr of the reference voltage circuits 115 and 116 the divided output which is the terminal voltage of the secondary batteries 101 and 102 divided by the voltage division circuits 111 and 112, respectively, to detect an over-charge state.

The output of the over-charge detection comparators 113 and 114 becomes high when the level of the divided output voltage inputted to their positive phase input terminals becomes higher than the reference voltage Vr.

The internal control circuit 120 outputs a signal for controlling the switch circuit 103 with the output of the over-charge detection comparators as an input signal.

FIG. 4 is a block diagram of the comparators used in FIGS. 1 and 3. The comparator is provided with a positive phase input terminal 130, an inverted input terminal 131, an output terminal 132 of which the voltage level of the output varies depending on the voltage input to the positive phase input terminal 130 and to the inverted input terminal 131, and a positive power supply terminal 133 and a negative power supply terminal 134 for supplying power for operating the comparator.

The comparator consumes current flowing from the positive power supply terminal to the negative power supply terminal.

The power supply of the over-charge detection comparators 113 and 114 is the positive electrode of the upper serially-connected secondary battery 101 and the negative electrode of the lower serially-connected secondary battery 102.

Accordingly, assuming that i1 and i2 represent the current consumption of the over-charge detection comparators 113 and 114, respectively, and the current consumption I of the over-charge detection comparators of the charging and discharging control circuit 110 is i1+i2, which is equivalent to the current consumed by the two comparators for over-charge detection.

With regard to over-discharge, similarly, the current consumption of the over-discharge comparators of the charging and discharging control circuit, in the case that a plurality of secondary batteries are serially connected, is equal to that of the plurality of over-discharge detection comparators.

An object of the present invention is therefore, in order to solve these conventional problems, by serially connecting positive power supply terminals and negative power supply terminals of means for detecting over-charge or means for detecting over-discharge, to decrease a current consumption of the charging and discharging control circuit, and to extend the operating time per charge of secondary batteries.

DESCRIPTION OF THE PREFERRED EMBODIMENTS

Figure 1:
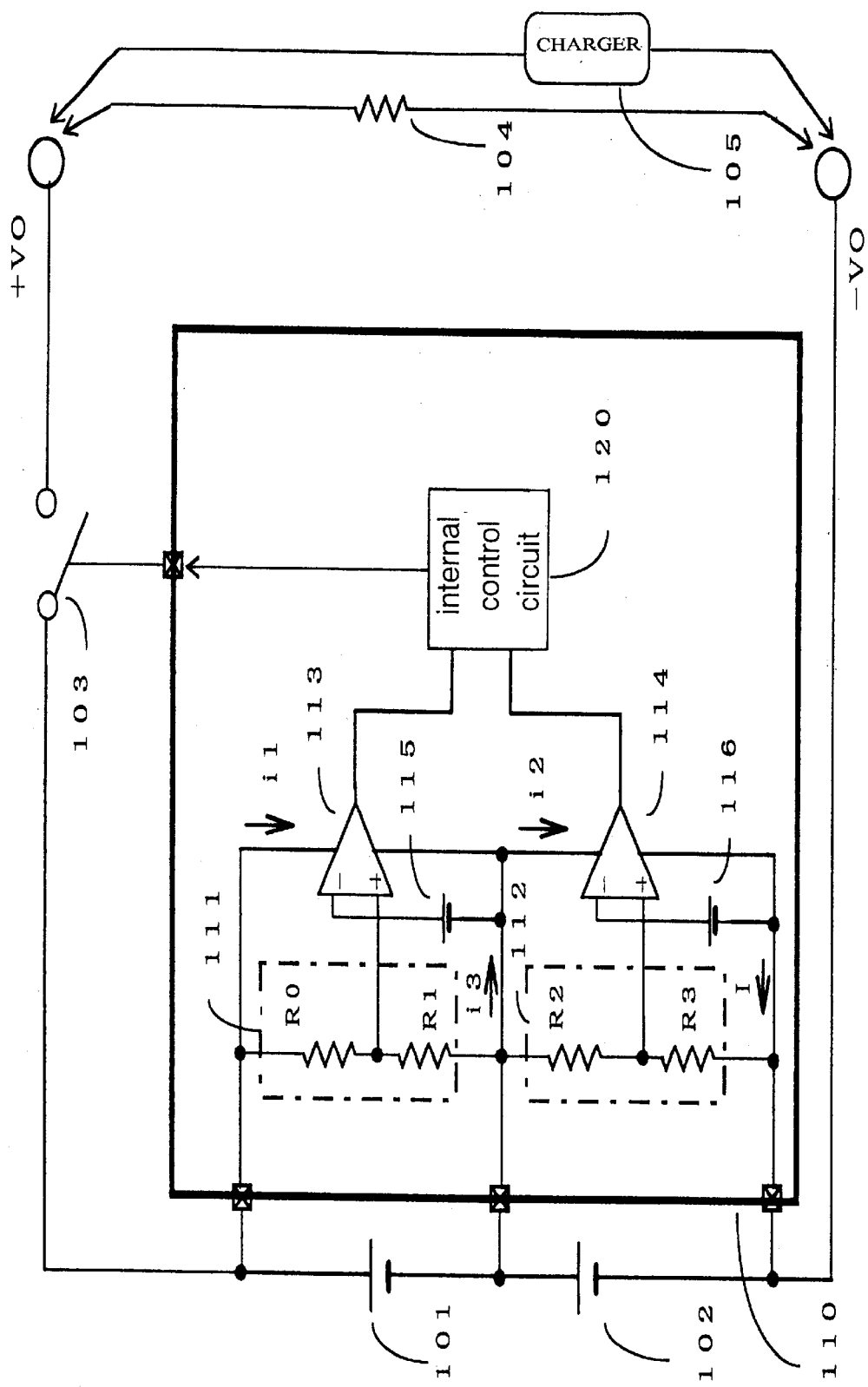
FIG. 1 is a circuit block diagram of an embodiment of a charging type power supply device according to the present invention.
Figure 2:
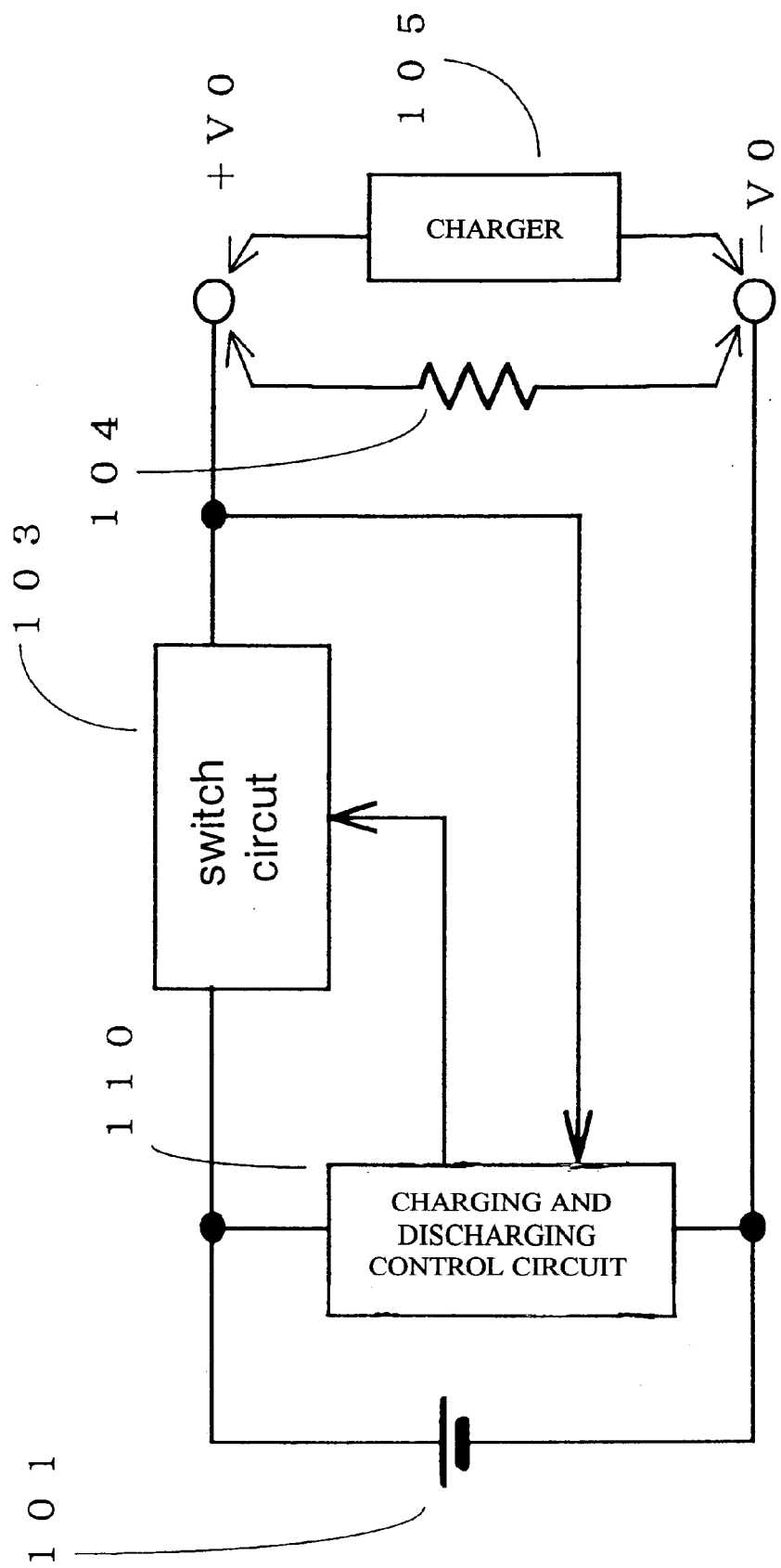
FIG. 2 is a block diagram of a conventional charging type power supply device.
Figure 3:
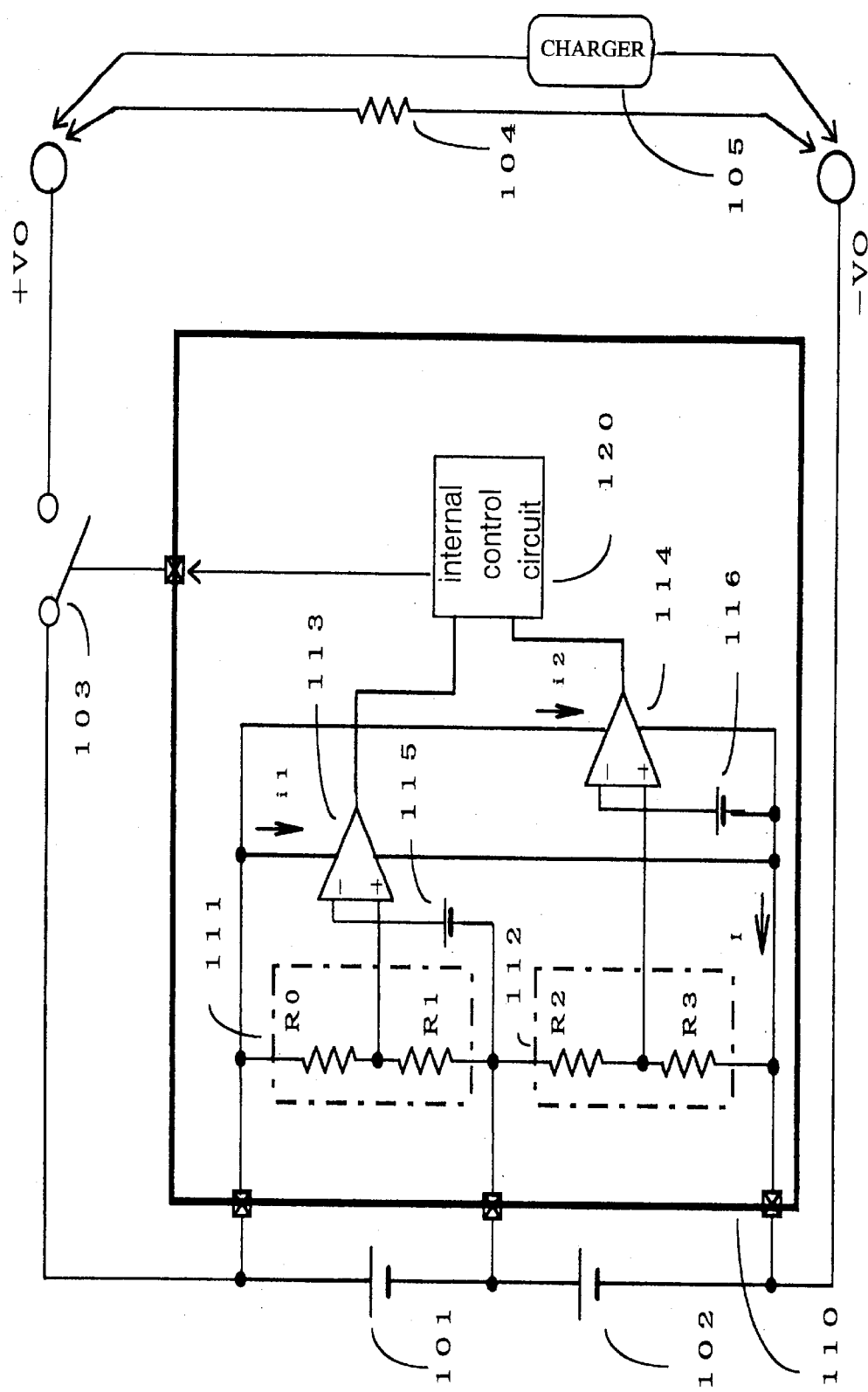
FIG. 3 is a circuit block diagram of the conventional charging type power supply device.
Figure 4:
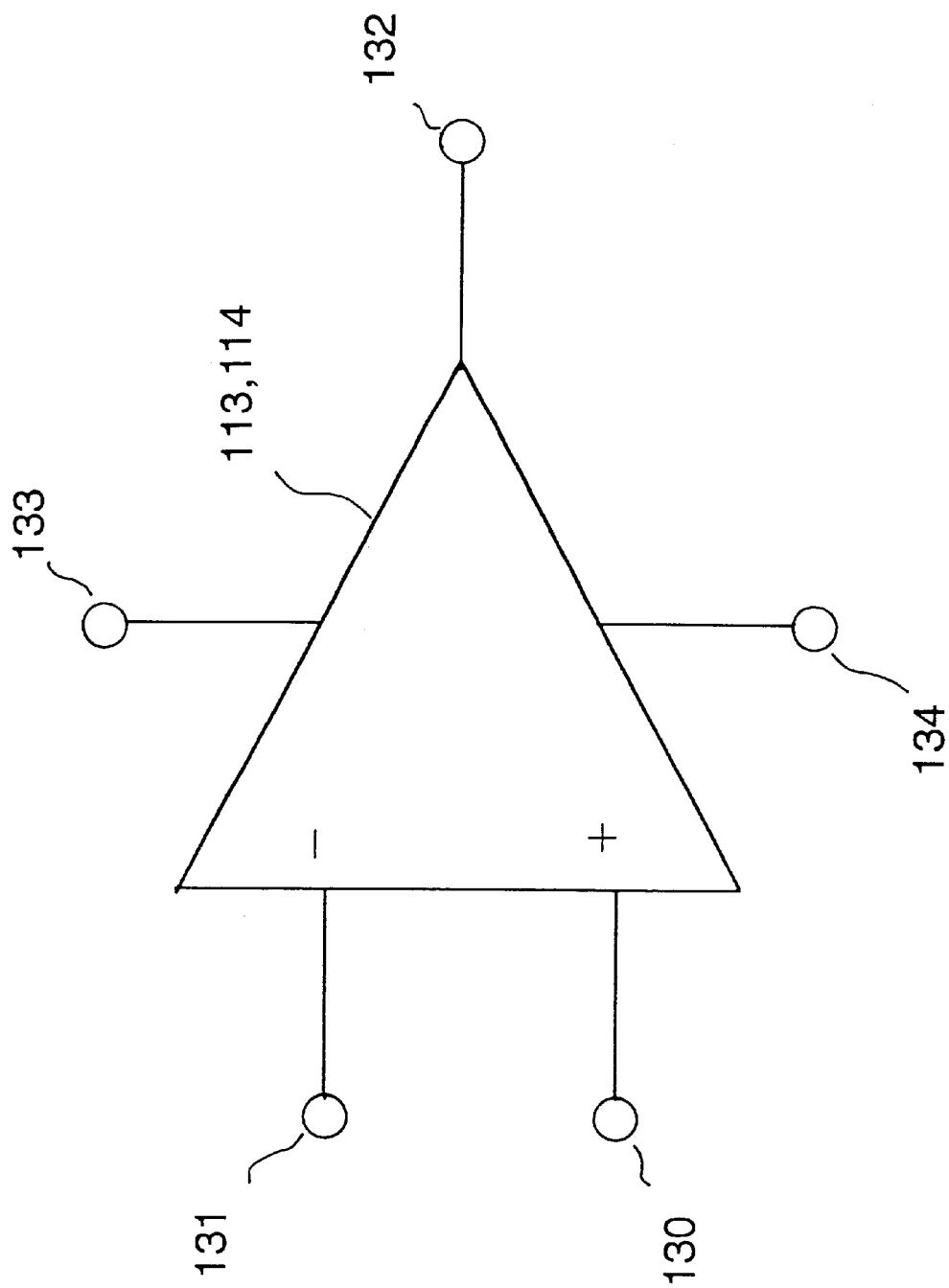
FIG. 4 is an explanatory view illustrating the respective terminals of comparators in the block diagrams.

FIG. 1 is a block diagram of a charging type power supply device including a charging and discharging control circuit of the present invention. An embodiment of the present invention is described in the following discussion based on FIG. 1. In this circuit, only a circuit for over-charge detection is shown. A positive electrode of a secondary battery 101 is connected to an external power supply terminal +V0 through a switch circuit 103. The voltage of the secondary batteries 101 and 102 is detected by the charging and discharging control circuit 110. According to the result of the detection, the switch circuit 103 is controlled to be turned on/off. The charging and discharging control circuit 110 comprises: a reference voltage circuit 115 for supplying a predetermined reference voltage Vr to an input terminal of an over-charge detection comparator 113; a reference voltage circuit 116 for supplying predetermined reference voltage Vr to an input terminal of an over-charge detection comparator 114; a voltage division circuit 111 including resistors R0 and R1, for dividing the terminal voltage of the secondary battery 101; a voltage division circuit 112 including resistors R2 and R3, for dividing the terminal voltage of the secondary battery 102; and an internal control circuit 120. The voltage division circuits 111, 112 and their associated detection comparators 113, 114 constitute detecting circuits for detecting the state of the secondary batteries 101, 102 and outputting a corresponding signal to the internal control circuit 120.

The switch circuit 103 is controlled by the output of the charging and discharging control circuit 110.

A charger 105 for charging the secondary batteries 101 and 102, and a load 104 to which the secondary batteries 101 and 102 supply current are connected between external power supply terminals +V0 and −V0.

The over-charge detection comparator 113 has a function of comparing the reference voltage Vr of the reference voltage circuit 115 and the divided output which is the terminal voltage of the secondary battery 101 divided by the resistors R0 and R1 of the voltage division circuit 111 to detect an over-charge state.

Similarly, the over-charge detection comparator 114 has a function of comparing with the reference voltage Vr of the reference voltage circuit 116 with the divided output which is the terminal voltage of the secondary battery 102 divided by the resistors R2 and R3 of the voltage division circuit 112 to detect an over-charge state.

The output of the over-charge detection comparators 113 and 114 becomes high when the level of the divided output voltage input to their positive phase input terminals becomes higher than the reference voltage Vr.

The internal control circuit 120 outputs a signal for controlling the switch circuit 103 with the output of the over-charge detection comparators as an input signal.

The positive power supply terminal of the over-charge detection comparator 113 is connected to the positive electrode of the secondary battery 101, while its negative power supply terminal is connected to the positive power supply terminal of the over-charge detection comparator 114 and to a mode between the negative electrode of the secondary battery 101 and the positive electrode of the secondary battery 102. The negative power supply terminal of the over-charge detection comparator 114 is connected to the negative electrode of the secondary battery 102. Since the positive power supply terminals and the negative power supply terminals of the over-charge detection comparators 113 and 114 are serially connected, the current consumption I of the over-charge detection comparators as a whole is, assuming the current consumption i1 of the over-charge detection comparator 113 equals the current consumption i2 of the over-charge detection comparator 114, I=i1=i2.

Even in the case that i1 does not equal i2, a current level which equals the difference between i1 and i2 flows from the terminal connecting the negative electrode of the secondary battery 101 and the positive electrode of the secondary battery 102, and the current consumption of the over-charge detection comparators as a whole is larger one of the current consumptions i1 and i2 of the over-charge detection comparators 113 and 114.

This makes it possible to decrease the current consumption of the control circuit as a whole and to extend the usable time per charge of the power supply device using the secondary batteries.

Though the above description is addressed only to over-charge detection, it is also possible to structure a circuit similarly with regard to over-discharge.

Further, though comparators are used as the means for detecting over-charge and over-discharge, it is also possible to form the circuit similarly with other detecting means having positive power supply terminals and negative power supply terminals.

Further, it is also similarly possible to serially connect positive power supply terminals and negative power supply terminals of the means for detecting over-charge and over-discharge.

According to the present invention, by serially connecting positive power supply terminals and negative power supply terminals of the over-charge detection circuit or the over-discharge detection circuit, the current consumption of the charging and discharging control circuit is decreased and the operating time per charge of the secondary batteries is extended.

What is claimed is:

1. A charging and discharging control circuit comprising: a plurality of detecting circuits for detecting at least one of an over-charge state and an over-discharge state of a plurality of serially-connected secondary batteries and outputting a corresponding signal; and a control circuit for receiving an output signal of the detecting circuits and outputting a signal for controlling the charging and discharging of the secondary batteries, wherein positive power supply terminals and negative power supply terminals of the detecting circuits are serially connected so that the power supply current of the charging and discharging control circuit is conserved.

2. A charging type power supply device comprising: a plurality of serially-connected secondary batteries; a switch circuit for connecting the batteries to an external power supply terminals; and a charging and discharging control circuit comprising a plurality of detecting circuits for detecting at least one of an over-charge state and an over-discharge state of the secondary batteries, and a control circuit for receiving an output of the detecting circuits and controlling the switch circuit to disconnect the secondary batteries from the external power supply terminal when one of an over-charge state and an over-discharge state is detected; wherein at least one of positive power supply terminals and negative power supply terminals of the detecting circuits are serially connected so that the power supply current of the charging and discharging control circuit is conserved.

3. A charging and discharging control circuit according to claim 1; wherein the detecting circuits each comprises a comparator for comparing a reference voltage with a voltage representing an output voltage of a respective secondary battery.

4. A charging and discharging control circuit according to claim 3; further comprising a voltage dividing circuit for dividing output voltages of the respective secondary batteries and producing a plurality of divided output voltages, wherein respective divided output voltages are supplied to a comparator of each detecting circuit as the voltage representing an output voltage of the secondary battery.

5. A charging and discharging control circuit according to claim 4; wherein the voltage dividing circuit comprises a plurality of serially-connected resistors for dividing the output voltage of the secondary batteries, and wherein the reference voltage and the resistance value of the resistors are selected so that an output of the respective comparators switch when a corresponding secondary battery enters an over-charge state.

6. A charging and discharging control circuit according to claim 5; wherein the voltage dividing circuit comprises a plurality of resistors for dividing the output voltage of the secondary batteries, and wherein the reference voltage and the resistance value of the resistors are selected so that an output of the respective comparators switch when a corresponding secondary battery enters an over-discharge state.

7. A charging and discharging control circuit according to claim 3; wherein the reference voltage is an over-charge voltage of the secondary batteries.

8. A charging and discharging control circuit according to claim 3; wherein the reference voltage is an over-discharge voltage of the secondary batteries.

9. A charging and discharging control circuit according to claim 2; wherein the detecting circuits each comprises a comparator for comparing a reference voltage with a voltage representing an output voltage of a respective secondary battery.

10. A charging and discharging control circuit according to claim 9; further comprising a voltage dividing circuit for dividing output voltages of the respective secondary batteries and producing a plurality of divided output voltages, wherein respective divided output voltages are supplied to a comparator of each detecting circuit as the voltage representing an output voltage of the secondary battery.

11. A charging and discharging control circuit according to claim 10; wherein the voltage dividing circuit comprises a plurality of serially-connected resistors for dividing the output voltage of the secondary batteries, and wherein the reference voltage and the resistance value of the resistors are selected so that an output of the respective comparators switch when a corresponding secondary battery enters an over-charge state.

12. A charging and discharging control circuit according to claim 11; wherein the voltage dividing circuit comprises a plurality of resistors for dividing the output voltage of the secondary batteries, and wherein the reference voltage and the resistance value of the resistors are selected so that an output of the respective comparators switch when a corresponding secondary battery enters an over-discharge state.

13. A charging and discharging control circuit according to claim 9; wherein the reference voltage is an over-charge voltage of the secondary batteries.

14. A charging and discharging control circuit according to claim 9; wherein the reference voltage is an over-discharge voltage of the secondary batteries.

15. A charging and discharging control circuit comprising: a plurality of detecting circuits for detecting at least one of an over-charge state and an over-discharge state of a plurality of serially-connected secondary batteries and outputting a corresponding signal; and a control circuit for receiving an output signal of the detecting circuits and outputting a signal for controlling the charging and discharging of the secondary batteries; wherein the detecting circuits each comprise a comparator for comparing a reference voltage with a voltage representing an output voltage of a respective secondary battery, and a voltage dividing circuit comprised of a plurality of serially-connected resistors for dividing output voltages of the respective secondary batteries and producing a plurality of divided output voltages, respective divided output voltages being supplied to a comparator of each detecting circuit as the voltage representing an output voltage of the secondary battery; and wherein the reference voltage and the resistance value of the resistors are selected so that outputs of the respective comparators switch when a corresponding secondary battery enters one of an over-charge state and an over-discharge state; and wherein positive power supply terminals and negative power supply terminals of the detecting circuits are serially connected so that the power supply current of the charging and discharging control circuit is conserved.

16. A charging and discharging control circuit according to claim 15; wherein the reference voltage is one of an over-charge voltage and an over-discharge voltage of the secondary batteries.

17. A charging type power supply device comprising:
a plurality of serially-connected secondary batteries; a switch circuit for connecting the batteries to an external power supply terminal; and a charging and discharging control circuit comprising a plurality of detecting circuits for detecting at least one of an over-charge state and an over-discharge state of the secondary batteries, and a control circuit for receiving an output of the detecting circuits and controlling the switch circuit to disconnect the secondary batteries from the external power supply terminal when one of an over-charge state and an over-discharge state is detected;
wherein at least one of positive power supply terminals and negative power supply terminals of the detecting circuits are serially connected so that the power supply current of the charging and discharging control circuit is conserved; wherein the detecting circuits each comprises a comparator for comparing a reference voltage with a voltage representing an output voltage of a respective secondary battery, and a voltage dividing circuit for dividing output voltages of the respective secondary batteries and producing a plurality of divided output voltages; wherein respective divided output voltages are supplied to a comparator of each detecting circuit as the voltage representing an output voltage of the secondary battery; wherein each voltage dividing circuit comprises a plurality of serially-connected resistors for dividing the output voltage of the secondary batteries; and wherein the reference voltage and the resistance value of the resistors are selected so that an output of the respective comparators switch when a corresponding secondary battery enters one of an over-charge state and an over-discharge state.

18. A charging and discharging control circuit according to claim 17; wherein the reference voltage is one of an over-charge voltage and an over-discharge voltage of the secondary batteries.

19. A charging and discharging control circuit comprising: a plurality of detecting circuits for detecting at least one of an over-charge state and an over-discharge state of an electric power source; and a control circuit for receiving output signals from the detecting circuits and for disconnecting the electric power source from an external device when one of an over-charge state and an over-discharge state is detected for controlling charging and discharging of the electric power source; wherein a single supply current is provided to the plural detecting circuits to conserve supply current; wherein the electric power source comprises a plurality of serially-connected secondary batteries; wherein the detecting circuits each comprises a comparator for comparing a reference voltage with a voltage representing an output voltage of a respective secondary battery, and a voltage dividing circuit comprising a plurality of serially-connected resistors for dividing output voltages of the respective secondary batteries and producing a plurality of divided output voltages; wherein respective divided output voltages are supplied to a comparator of each detecting circuit as the voltage representing an output voltage of the secondary battery; and wherein the reference voltage and the resistance value of the resistors are selected so that an output of the respective comparators switch when a corresponding secondary battery enters one of an over-charge state and an over-discharge state.

20. A charging and discharging control circuit according to claim 19; wherein the reference voltage is one of an over-charge voltage and an over-discharge voltage of the secondary batteries.

21. A charging and discharging control circuit comprising: a plurality of detecting circuits for detecting at least one of an over-charge state and an over-discharge state of a secondary battery and outputting a corresponding signal; and a control circuit for receiving an output signal of the detecting circuits and outputting a signal for controlling the charging and discharging of the secondary battery; wherein positive power supply terminals and negative power supply terminals of two or more of the detecting circuits are serially connected so that the power supply current of the charging and discharging control circuit is conserved.

22. A charging and discharging control circuit according to claim 21; wherein the secondary battery comprises a plurality of secondary batteries.

23. A charging and discharging control circuit according to claim 22; wherein the detecting circuits each comprises a comparator for comparing a reference voltage with a voltage representing an output voltage of a respective secondary battery.

24. A charging and discharging control circuit according to claim 23; wherein each detecting circuit further comprises a voltage dividing circuit for dividing output voltages of the respective secondary batteries and producing a plurality of divided output voltages, the respective divided output voltages being supplied to a comparator of each detecting circuit as the voltage representing an output voltage of the secondary battery.

25. A charging and discharging control circuit according to claim 24; wherein the voltage dividing circuit comprises a plurality of serially-connected resistors for dividing the output voltage of the secondary batteries, and wherein the reference voltage and the resistance value of the resistors are selected so that an output of the respective comparators switch when a corresponding secondary battery enters an over-charge state.

26. A charging and discharging control circuit according to claim 25; wherein the voltage dividing circuit comprises a plurality of resistors for dividing the output voltage of the secondary batteries, and wherein the reference voltage and the resistance value of the resistors are selected so that an output of the respective comparators switch when a corresponding secondary battery enters an over-discharge state.

27. A charging and discharging control circuit according to claim 23; wherein the reference voltage is an over-charge voltage of the secondary batteries.

28. A charging and discharging control circuit according to claim 23; wherein the reference voltage is an over-discharge voltage of the secondary batteries.

* * * * *